Sept. 3, 1957     H. T. SPARROW     2,805,026
TEMPERATURE CONTROL APPARATUS FOR PLURAL ZONES
Filed March 8, 1954
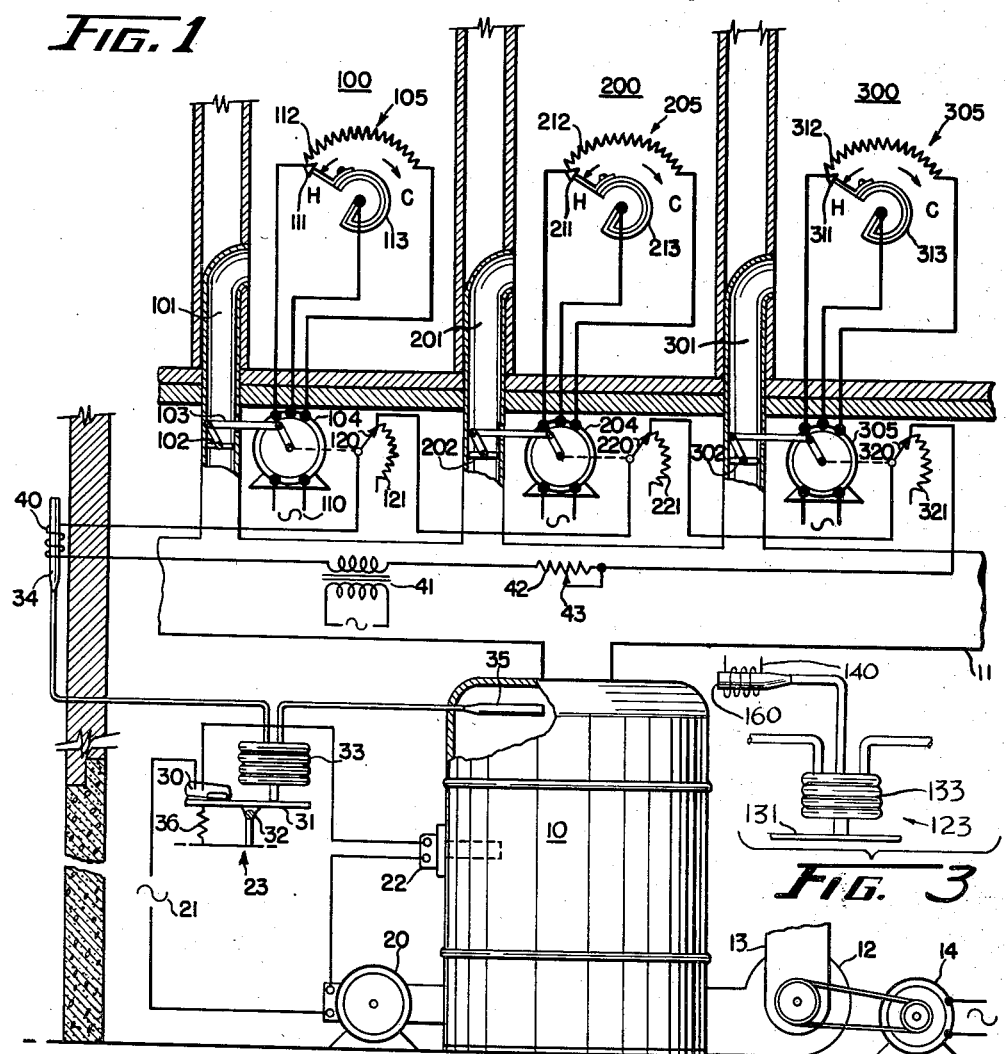
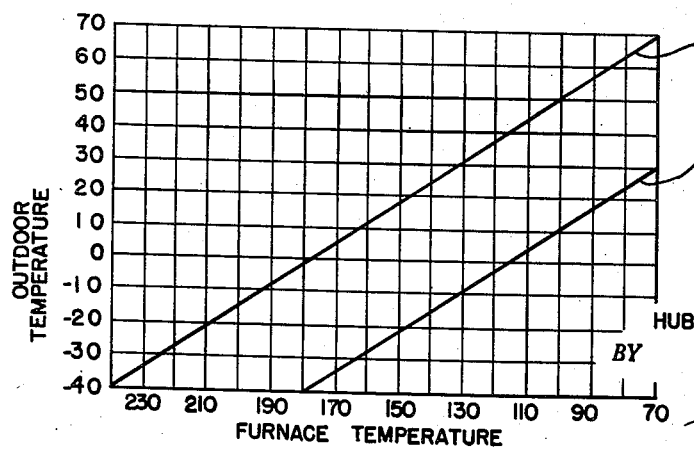
INVENTOR.
HUBERT T. SPARROW
BY
George H Fisher
ATTORNEY United States Patent Office 2,805,026
Patented Sept. 3, 1957

2,805,026

TEMPERATURE CONTROL APPARATUS FOR PLURAL ZONES

Hubert T. Sparrow, Edina, Minn., assignor to Minneapolis-Honeywell Regulator Company, Minneapolis, Minn., a corporation of Delaware Application March 8, 1954, Serial No. 414,659

11 Claims. (Cl. 236—9)

This invention relates to a temperature control system for a plurality of zones, each having temperature responsive means for controlling the quantity of heating medium furnished to its respective zone, and means for controlling the temperature of the delivered heating medium in response to outdoor temperature and the total quantity of medium being delivered to the zones.

Where it is desired to separate different areas of a home into heating zones and to provide for temperature control in each zone independent of the other zones usually a complicated and expensive furnace control system is necessary to provide adequate control of the heat output of the furnace in response to outdoor temperature as well as the heating load. There is a a great need for an inexpensive and simple control system for controlling such heating installations in small dwellings.

The present invention, therefore, provides a temperature control system for a heating installation having a plurality of zones which are individually controlled by temperature responsive means located in each zone for adjusting the quantity of heating medium that is delivered to each respective zone. The heat furnishing source or furnace is maintained at a temperature level in response to the outdoor temperature and the total load demand of all of the zones. In the particular embodiment described hereinafter, a switch being operated by a pressure responsive bellows having a pair of bulbs connected thereto, controls the operation of the furnace. One bulb is responsive to the output temperature of the furnace and the other is responsive to outdoor temperature, the combined effect of the two bulbs effectively schedules the operating temperature of the furnace. An additional source of heat is provided for the outdoor bulb, the amount being proportional to the total heating load of the zones as indicated by damper positions so that the furnace output temperature can be increased proportionally to such load for any given outdoor temperature.

An object of the present invention is to provide an inexpensive and simple condition controlling system wherein the operation of a condition changing means is controlled in response to the collective effects of two conditions;

Another object of the present invention is to provide an inexpensive and simple control system for a multi-zone heating installation wherein the operating temperature of a heat furnishing means is proportionally controlled in response to the combined effects of outdoor temperature and heating load;

Still another object of the present invention is to provide an inexpensive control system for a multi-zone home heating installation wherein the quantity of heat delivering medium delivered to each zone from a furnace is controlled by an individual zone temperature responsive means and the temperature of the medium leaving the furnace is controlled in response to outdoor temperature and the total quantity of medium delivered to the zones.

For a more thorough understanding of the invention, reference is made to the following specification and accompanying drawing in which:

A Figure 1 illustrates one form of the invention as applied to a multi-zone force air heating installation.

A Figure 2 is a graphical representation of particular operating schedules of the maintained furnace temperature for various values of outdoor temperature with the dampers all closed and the dampers all open.

Referring to Figure 1 a conventional heat furnishing means or furnace 10 supplies hot air to a plurality of zones 100, 200, and 300 by means of a main duct 11 and a series of branch ducts 101, 201, and 301. Air is circulated through the furnace and to the zones by a blower 12 connected to a return duct 13 which is also connected to each zone by a series of branch ducts, not shown. Blower 12 is continuously operated by a motor 14 or controlled by a conventional bonnet temperature controller, not shown, set to cut off the fan at some preset low temperature in the furnace.

Heat is furnished to furnace 10 by a burner 20 connected to a source of power 21 through a series circuit comprising a high temperature limit control 22 and a controller 23, the details of which will be explained hereinafter. Limit control 22 is normally closed and upon the operation of controller 23, burner 20 is energized to furnish heat to the furnace. Should the temperature of the furnace exceed a predetermined maximum safe value limit control 22 renders the burner inoperative until the furnace temperature has decreased.

The quantity of heating medium or air as in this case delivered to each of the zones is controlled by dampers 102, 202, and 302 located in the respective ducts 101, 201 and 301. For convenience, the operation and controlling means of one damper is explained and as each zone is similar the operation of one can be applied to all. Referring in particular to the network in zone 100, damper 102 is controlled through a linkage 103 by a motor 104 which responds to a temperature responsive device or thermostat 105 located in the zone 100. Motor 104 and thermostat 105 are of a sort similar to the disclosure of Patent 2,028,110 granted to Daniel G. Taylor on January 14, 1936. With the motor connected to a source of power 110 movement of wiper 111 on resistor 112 in response to the temperature operated bimetal 113 selects the position of the output lever of the motor. As shown the desired temperature in zone 100 is satisfied and bimetal 113 is holding wiper 111 at the far left end of resistor 112, at which position the internal bridge circuit, not shown, can only be balanced with the output lever of motor 104 in a position to maintain damper 102 closed. As the temperature in zone 100 decreases wiper 111 moves to the right across resistor 112 and for every position of wiper 111 there is a respective position for damper 102. Under a completely unsatisfied condition of thermostat 105, wiper 111 is positioned on resistor 112 at the right hand extremity, in which position damper 102 is vertical or wide open.

Connected to the output shaft of motor 104 is a wiper 120 of the rheostat having a resistor 121. Movement of the output shaft of the motor from the wide open to closed position of damper 102 provides for movement of wiper 120 from one extremity to the other on resistor 121. The operation of this rheostat will be explained in more detail later in the specification.

Controller 23 comprises a mercury switch 30 mounted on the left end of a platform 31 that is pivotally supported at its midpoint 32 and is biased in a counterclockwise direction by spring 36. Engaging platform 31 at the end opposite switch 30 is a bellows assembly 33 having two remotely positioned fluid filled bubs 34 and 35 associated therewith. Bulb 34 is responsive to outdoor temperature and bulb 35 is responsive to furnace temperature. While a specific type of controller 23 is shown there is available various types of switch mechanisms having a plurality of remotely located condition responsive bulbs. The type that is shown herein is normally calibrated at the factory by filling the bellows and bulbs with a fluid so that when either bulb is heated the internal pressure increases to expand bellows 33. Shown in Figure 2 is a graphical representation of the operation of a particular controller, such as that shown herein. The line labeled, dampers open, indicates the operation line of switch 30 as plotted for various outdoor temperatures or temperatures of bulb 34. Assuming that switch 30 will be closed at any point below the line, it is obvious that for any outdoor temperature a selected furnace temperature is maintained.

A heater winding 40 is shown around bulb 34 and is connected to a source of power 41 through a series circuit comprising wiper 120, resistor 121, wiper 220, resistor 221, wiper 320, resistor 321, and a limiting resistor 42 having a wiper 43 for shorting a portion of resistor 42 out of the circuit. With all of the dampers 102, 202, and 302 in a closed position, wipers 120, 220, and 320 are at the upper extremity of their respective rheostats and the current in heater 40 resulting from power source 41 is limited only by resistor 42. Under such conditions a new operation link is established as shown in Figure 2 and labeled, dampers closed, the lower operation line being established by position of wiper 43 on resistor 42. This calibration matches the furnace output capacity to the heating load or size of house being heated so that during a greater part of the average load periods the zones will be satisfied with the respective dampers approximately half open. The furnace temperature schedule during these average load periods would follow an operation line approximately midway between the two lines shown in Figure 2. Such matching provides for better temperature control especially when the furnace is oversize for the particular dwelling. For illustrative purposes only, referring to Figure 2, let us assume that controller 23 is calibrated so that when outdoor bulb 34 is exposed to a zero degree temperature and no extra heat is applied to bulb 34 it will maintain the furnace temperature at approximately 178°. The limiting resistor can be adjusted so that when all of the dampers are closed the external bulb temperature is artificially heated and the maintained furnace temperature is reduced to 117° for satisfactory standby operation. As any one of the zones needs heat and wiper 111 moves across resistor 112 to open damper 102, wiper 120 will also move downward on rheostat 121 to increase the resistance in the circuit of heater 40. This effectively reduces the outdoor bulb temperature and assuming that the outdoor temperature remains the same, the maintained furnace temperature is increased so that the furnace is capable of bringing the temperature of zone 100 back to its desired value. Should all of the zones need heat at the same time and dampers 102, 202, and 302 open, the resistance in the heater circuit is increased even more to further increase the maintained furnace temperature.

The effect of the variations in heating load of the zones could be reflected to the furnace controller by the application of the heat of heater 40 on other components of controller 23 as shown in Figure 3; however, the effect of wind is compensated for with the heater on the outdoor bulb. During windy weather when the heat loss of a building or dwelling is increased, the heat applied to the outdoor bulb is less effective in reducing the maintained furnace temperature. The increased furnace temperature over that temperature maintained at the same outdoor temperature during still weather overcomes the increased heat loss of the zones and provides a more adequate temperature control.

A second embodiment of a controller 123 similar to the controller 23 is shown in Figure 3. Controller 123 has a bellows assembly 133 to which three bulbs are connected in a closed liquid filled system. Two of the bulbs being similar to those shown connected to bellows 33, that is a bulb responsive to the outdoor temperature and a bulb responsive to the furnace temperature. A third bulb 160 is located relatively close to bellows 133 and has an electric heater 140 wound thereabout. This heater is connected into the system in a manner as heater 40 as shown in Figure 1. It is obvious with the arrangement as shown in Figure 3 variations in the heating load as affected by windy weather will have no effect as bulb 160 is normally located inside the dwelling.

*Operation*

As shown, assuming that there is power available at sources 21 and 41 and that the motor 14 is continuously operating blower 12, all of the zones are satisfied and the combined effect of the outdoor temperature and the heat applied to the bulb 34 by heater 40 has selected a furnace temperature to be maintained lower than the actual furnace temperature, thereby switch 30 is open and burner 20 is deenergized. Whenever the furnace temperature drops below that temperature indicated by the intersection of a line drawn from the outdoor temperature and operation line (dampers closed) the burner will operate. Upon a call for heat in zone 100 wiper 111 moves to the right on resistance 112 causing damper 102 to open and the resistance in the heater circuit is increased by moving wiper 120 downward on rheostat 121. Warm air is forced from the furnace through duct 101 into the zone 100 and the maintained temperature in the furnace is increased for a given outdoor temperature so that the air leaving the furnace to satisfy zone 100 is warmer than the maintained furnace temperature during standby conditions. A new operation line between the lines shown in Figure 2 is then established. Should zones 100, 200, and 300 all demand heat at the same time the load on the furnace is increased even more and in order to satisfy this condition the temperature of the furnace output is increased. The maximum load operation line (dampers open) is adhered to until any one damper changes its position upon the satisfaction of a room thermostat.

As the load condition of zones 100, 200, and 300 increases as the outdoor temperature decreases, the maintained furnace temperature is thereby increased so that the output of the furnace supplies the load demand of the zones more readily during these high load conditions. A similar result would take place with a high wind outside which increases the building heat loss to increase the load demand to maintain the zones at a predetermined temperature. The wind makes the heat of heater 40 less effective in holding the maintained furnace temperature down so that a higher furnace output is available during windy weather to more readily satisfy the load demand of the zones.

The control apparatus operates in substantially the same manner with controller 123 used in place of controller 23 as variations in the positions of the dampers 102, 202, and 302 would be effective to vary the heat applied by heater 140 to bulb 160. This would modify the maintained furnace temperature for a given outdoor temperature in the same manner as with controller 23 when heat was applied to the bulb 34 by heater 40; however, windy weather would have no effect on heater 140 and the temperature maintained in the furnace depends upon the outdoor temperature alone except as modified by the heating load by its effect on bulb 160.

Having described the preferred embodiment of this invention it should be understood that such a heating control system could be readily adapted to other types of heat furnishing means such as hot water or steam systems therefore it should be understood that this is for purposes of illustration only and that the invention is to be limited only by the scope of the appended claims.

1. In temperature control apparatus, temperature changing means for supplying a quantity of air to a plurality of spaces, a plurality of conduit means connecting said temperature changing means and each of said spaces, temperature responsive means in each space, flow control means in each of said conduit means, motor means for driving each of said flow control means, said motor means being controlled by its respective temperature responsive means, pressure responsive bellows means having an indoor and an outdoor bulb connected thereto, said indoor bulb being responsive to the temperature of said temperature changing means, switch means actuated by said bellows means for controlling said temperature changing means to maintain a selected air temperature for every outdoor temperature, a source of power, electrical heater means for heating said outdoor bulb, a plurality of variable resistance means each of which is adjusted by its respective motor means, and connection means including all of said variable resistance means for connecting said heater to said source of power thereby upon a decrease in total air flow to the spaces by said flow control means heat is applied to said outdoor bulb by said heater means to decrease the air temperature.

2. In a temperature control system, temperature changing means for a plurality of spaces, connection means connecting said changing means and said spaces so that a medium is directed from said changing means to each of said spaces to maintain the temperature of each space at a predetermined value, flow control means associated with each of said connection means for controlling the quantity of said medium to each space, temperature responsive means responsive to the temperature of each space connected in controlling relation to said flow control means of its respective connection means, a heat leveling device comprising an outdoor bulb and an indoor bulb, said indoor bulb being responsive to the temperature of said temperature changing means, said leveling device being connected to said temperature changing means to maintain a level of heat output of said temperature changing means in proportion to said outdoor temperature, heating means associated with said device for changing the level of heat output, variable resistance means operated by each flow control means in a manner to have a maximum resistance at maximum flow, and means including each of said resistance means for connecting said heating means to a source of power so that the heat level of said temperature changing means is decreased when all flow control means are closed.

3. In a temperature control apparatus, temperature changing means for supplying a quantity of temperature changing medium to a space, flow control means for controlling the quantity of medium to said space, temperature responsive means responsive to space temperature connected in controlling relation to said flow control means, temperature control means for controlling the temperature of said medium leaving said temperature changing means, said control means having an indoor and an outdoor temperature responsive means said indoor responsive means being responsive to the temperature of the medium leaving said temperature changing means, heating means for increasing the temperature of said outdoor means to lower the temperature of said medium, and means associated with said flow control means for regulating the operation of said heating means to increase the medium temperature as said quantity increases.

4. In temperature control apparatus, temperature changing means for supplying a quantity of heated air to a space, flow control means for controlling the quantity of air delivered to said space, temperature responsive means responsive to space temperature, connection means connecting said responsive means to control said flow control means, temperature proportioning means controlling said temperature changing means for maintaining said air therein at a predetermined temperature for every outdoor temperature, and means connected to said flow control means for adjusting said temperature proportioning means so that the temperature of said air can be proportionally reduced when the quantity is reduced.

5. In control apparatus for use with a hot air heating system, motor driven damper means for controlling the air output of the furnace to a space to be heated, the furnace having a burner, temperature responsive means responsive to the temperature of the space connected to control said motor means, bellows operated switch means connected to control the burner and having a first, a second, and a third bulb connected to said bellows, said first bulb being responsive to outdoor temperature, said second bulb being responsive to the temperature of the air leaving the furnace, and heating means connected in heat transferring relation to said third bulb, said heating means being controlled by said motor means for decreasing the temperature of the furnace when there is no air output.

6. In temperature control apparatus, temperature changing means for supplying a quantity of heated medium, plurality of conduit means for delivering said medium to a plurality of spaces, flow control means associated with each of said conduits for controlling the quantity of medium being delivered to each space, temperature responsive means for each space connected for controlling its respective flow control means, heat leveling means having an outdoor temperature responsive means and temperature responsive means responsive to the temperature, said heat leveling means being connected to control said temperature changing means to maintain said medium at a temperature corresponding with the outdoor temperature of said temperature changing means, and means associated with said flow control means responsive to the collective quantities of said medium flowing to said spaces for proportionally modifying said heat leveling means thereby proportionally reducing the temperature of said temperature changing means.

7. In a temperature control system, heat furnishing means having a burner for providing a supply of heated medium, conduit means for individually connecting a plurality of zones to said heat furnishing means, individual control means for each of said conduit means for controlling the quantity of medium delivered to each zone, control means having outdoor temperature responsive means and medium temperature responsive means, said control means being connected to control the operation of said burner for maintaining the temperature of said heated medium at a predetermined value in response to outdoor temperature, and means associated with all of said individual control means for proportionally depressing the temperature of the heated medium in response to the total quantity of medium delivered to all zones.

8. In a temperature control system, heat furnishing means for supplying a quantity of heated medium to a plurality of zones, temperature responsive control means for each zone for controlling the quantity of medium that is delivered to its respective zone, pressure responsive switch means for controlling the temperature of said medium leaving said heat furnishing means, said switch means having a plurality of fluid filled bulbs connected thereto in a closed fluid system, a first of said bulbs being responsive to the temperature of said medium, a second of said bulbs being responsive to outdoor temperature, and means associated with said control means for proportionally increasing the pressure in said closed system to increase said medium temperature in response to an increase in the total quantity of medium being delivered to all of the zones.

9. In a temperature control system, heat furnishing means having a heat source, pressure responsive switch means for controlling the operating of said heat source, said switch means having a plurality of fluid filled bulbs connected thereto in a closed system, a first of said bulbs being responsive to the temperature of said heat furnishing means, a second of said bulbs being responsive to outdoor weather conditions, and external heating means for said second bulb for rendering it responsive to heat losses due to wind, said heating means increasing the temperature of said second bulb proportionally to the increased output of said heat furnishing means.

10. In a condition control system having a condition changing device for furnishing a quantity of conditioned medium to a plurality of spaces through associated conduits each of which has its own flow control device, means responsive to a condition indicative of the need of conditioned medium in each space, motor means for each of the flow control devices for controlling the flow of medium to its respective space, connection means connecting each of said first mentioned means to its associated motor means, control means adapted to control the condition changing device, said control means having a plurality of responsive means connected thereto, a first of said responsive means being responsive to the condition of the medium of the condition changing device, a second of said responsive means being responsive to a condition affecting the need of operation of the condition changing device, further means associated with each of said motor means for proportionally modifying the relation of said first and second means on said control means depending on the total quantity of conditioned medium supplied to the spaces.

11. In temperature control apparatus for temperature changing device connected to a plurality of spaces by individual conduits to supply temperature conditioned medium to the spaces each of which contains a flow control device, temperature responsive means responsive to the temperature in each space, motor means associated with each flow control device and adapted to control the same, connection means connecting said temperature responsive means to its respective motor means, control means for controlling the temperature changing device having a plurality of bulbs connected thereto, a first of said bulbs being responsive to outdoor temperature, a second of said bulbs being adapted to respond to the temperature of the medium of the temperature changing device, a third of said bulbs having electrical heater means, said control means being adapted to control the operation of the temperature changing device, a plurality of variable resistance means each being adjusted by its respective motor means, and further connection means for connecting said variable resistance means and said heater means to a source of power so that upon a closing of said flow control means heat is applied to said third bulb thereby proportionally effecting a reduction in the operation of the temperature changing device.

References Cited in the file of this patent

UNITED STATES PATENTS

| 378,137 | Johnson | Feb. 21, 1888 |
| 430,226 | Easton | June 17, 1890 |
| 1,785,426 | Raymond | Dec. 16, 1930 |
| 1,826,100 | Stewart | Oct. 6, 1931 |
| 2,006,282 | Smith | June 25, 1935 |
| 2,063,613 | McCarthy | Dec. 8, 1936 |
| 2,188,775 | Locke | Jan. 30, 1940 |

FOREIGN PATENTS

| 313,916 | Great Britain | Sept. 1, 1930 |